United States Patent [19]

Stuart

[11] Patent Number: 5,258,427
[45] Date of Patent: Nov. 2, 1993

[54] HEAT CURABLE ADHESIVE

[75] Inventor: David V. Stuart, Reservoir, Australia

[73] Assignee: ICI Australia Operations Proprietary Ltd., Melbourne, Australia

[21] Appl. No.: 702,251

[22] Filed: May 17, 1991

[30] Foreign Application Priority Data

May 17, 1990 [AU] Australia ............... PK0182

[51] Int. Cl.$^5$ .............................................. C08K 5/09
[52] U.S. Cl. .................................. 523/455; 523/456; 528/92; 427/386
[58] Field of Search ............... 523/456, 455; 528/92; 427/386

[56] References Cited

U.S. PATENT DOCUMENTS 4,593,056  6/1986  Qureshi et al. .
5,001,212  3/1991  Hammer et al. ............... 528/94

FOREIGN PATENT DOCUMENTS

3027576A1  2/1982  Fed. Rep. of Germany .

OTHER PUBLICATIONS

*Handbook of Epoxy Resins*, Lee and Neville (1967) pp. 10–17, 11–13, and 14–2.

Primary Examiner—Melvyn I. Marquis
Assistant Examiner—D. Aylward
Attorney, Agent, or Firm—Cushman, Darby & Cushman

[57] ABSTRACT

The present invention relates to an improved heat curable epoxy resin adhesive in which a metal oxide, for example zinc oxide, and a polyhydroxyaryl compound, for example gallic acid, are used in combination with an epoxy resin, for example a heat curable liquid epoxy resin adhesive, to give an adhesive composition having significantly improved binding strength and resistance to weathering. The epoxy resin adhesive composition of the invention has been found to be particularly advantageous in the bonding of metal surfaces providing higher bond strength over a prolonged period and improved resistance to the deterioration of bond strength in the presence of water or high humidity.

17 Claims, No Drawings

HEAT CURABLE ADHESIVE

The present invention relates to a heat curable adhesive and in particular to a heat curable epoxy resin adhesive.

A significant problem surrounding the use of epoxy resin adhesives on metal surfaces is the deterioration in bond strength which occurs over a period of time. The deterioration in bond strength is exacerbated by the presence of water or high humidity.

The use of some adhesion promoters may increase the initial bond strength however there is a need for an epoxy resin composition which provides a higher bond strength over a prolonged period.

We have now found that the use of certain metal oxides in combination with a polyhydroxyaryl compound provides a significantly improved adhesive.

Accordingly we provide a heat curable epoxy resin composition comprising a metal oxide and a polyhydroxyaryl compound of formula I

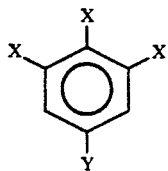

wherein each X is independently an —OH group or a group —ROH and at least one of the groups X is an —OH group; Y is a hydrogen atom, a group $R^1$, a group $COR^2$ or a group $NR^3R^4$; R is a divalent hydrocarbon or substituted hydrocarbon group; $R^1$ is a hydrocarbyl or substituted hydrocarbyl group; $R^2$ is a group $R^1$, $OR^3$ or $NR^3R^4$; $R^3$ is a hydrogen atom, a hydrocarbyl or a substituted hydrocarbyl group; $R^4$ is a hydrogen atom, a hydrocarbyl or a substituted hydrocarbyl group; and $R^3$ and $R^4$ are the same or different.

The group —ROH if present, may be an oxime group, for example of the type $CR^3$=NOH where $R^3$ is as defined and is preferably a hydrogen atom, or may be an hydroxyalkyl group of the type —$(CH_2)_nOH$, where n is an integer and is preferably one. We have obtained useful result when all of the groups X are —OH groups.

The group Y may be a hydrogen atom but it is preferred that Y is either a group $R^1$, particularly a $C_1$ to $C_{18}$ optionally substituted hydrocarbyl group, or especially a group $COR^2$. In the group $COR^2$ it is preferred that $R^2$ is either a group $OR^3$ or a group $NR^3R^4$. The group $OR^3$ can be a hydroxy or a substituted or unsubstituted $C_1$ to $C_{18}$ hydrocarbonoxy group. The group $NR^3R^4$ can be a substituted or unsubstituted amino group, wherein the groups attached to the carbon atom may be substituted for example as in an ethanolamino group. The group Y may include at least one hydrocarbyl group and this may contain up to 18 carbon atoms and may be saturated or unsaturated. If the hydrocarbyl group contains substituents, these may be halogen atoms, amino groups, hydroxy groups or epoxy groups.

As a preferred aspect of the present invention, the polyhydroxyaryl compound is of the formula I wherein: each X is an —OH group; Y is a hydrogen atom, a group $R^1$, a group $COR^2$ or a group $NR^3R^4$; $R^1$ is a $C_1$ to $C_6$ hydrocarbyl group optionally substituted with amino or hydroxy; $R^2$ is a group $R^1$, $OR^3$ or $NR^3R^4$; $R^3$ is a hydrogen atom or a $C_1$ to $C_{18}$ hydrocarbyl group; $R^4$ is a hydrogen atom or a $C_1$ to $C_{18}$ hydrocarbyl group optionally substituted with amino or hydroxy; and $R^3$ and $R^4$ are the same or different.

In a more preferred aspect of the present invention, the polyhydroxyaryl compound is of the formula I wherein:
each X is an —OH group;
Y is a hydrogen atom, a group $R^1$ or a group $COR^2$;
$R^1$ is a 2-aminoethyl or 2-hydroxyethyl group;
$R^2$ is a group $OR^3$ or $NR^3R^4$;
$R^3$ is a hydrogen atom or a $C_1$ to $C_{12}$ hydrocarbyl group;
$R^4$ is a hydrogen atom or a 2-hydroxyethyl group; and
$R^3$ and $R^4$ are the same or different.

The polyhydroxyaryl compound may be pyrogallol, gallic acid, methyl gallate, propyl gallate, dodecyl gallate, gallamide, a gallamide derivative such as N-(2-hydroxyethyl)- 3,4,5-tri-hydroxybenzoic acid amide or a substituted alkyl pyrogallol such as 5-(2-aminoethyl)-1,2,3-trihydroxybenzene. Gallic acid has been found to be particularly effective in the heat curable epoxy resins of the present invention.

The metal oxide is preferably selected from the oxides of the transition elements, and more preferably from the copper and zinc subgroups, of the periodic table.

It is particularly preferred that the metal oxide is zinc oxide which we have found to provide significantly improved adhesive properties when used in combination with a polyhydroxyaryl compound in the heat curable epoxy resin adhesive compositions of the present invention.

We accordingly provide a heat curable epoxy resin adhesive composition comprising a zinc oxide and a polyhydroxyaryl compound as hereinbefore defined.

The epoxy composition will typically comprise a curing agent which may be incorporated into the epoxy composition before during or after application to the metal or other surface.

Epoxy resins and their use as adhesives and coatings are well known in the art.

For example epoxy resins and their use as adhesives are discussed in "Encyclopaedia of Polymer Science and Engineering" Volume 6, 1986 at pages 322 to 388.

It is preferred that the epoxy composition is one which requires heating to a temperature of at least 100° C. and preferably at least 120° C. (and especially at least 150° C.) in order to effect curing of the epoxy composition. As a particularly preferred aspect of the present invention, curing is effected at a temperature in the range of 160° to 190° C.

Typically the epoxy resin will comprise in the range of from 0.1 to 20% w/w of the polyhydroxyaryl compound and preferably from 0.1 to 2% w/w.

The metal oxide is generally used in an amount of from 0.01 to 70% w/w of the composition and may function as a filler in addition to enhancing adhesion properties. Preferably zinc oxide is present in a catalytic amount such as in the range of from 0.01 to 10% and most preferably 0.1 to 5% by weight.

The epoxy resin may optionally comprise further components such as fillers, thixotropic agents and other additives known in the art.

A typical example of compositions of the invention comprises, in addition to the polyhydroxyl aryl compound and zinc oxide, 20 to 90% w/w liquid epoxy resin, 0 to 20% w/w toughening agent, 1 to 10% w/w latent curative, 0 to 70% mineral filler, 0 to 70% metal powder and 0 to 20% thixotropic agent.

Particularly preferred examples of the epoxy resin component are bisphenol A, bisphenol F diglycidyl ether and mixtures thereof. However it will be understood alternative resins may be selected from the wide range known in the art.

Particularly preferred examples of toughening agent include nitrite rubber with epoxy-reactive functional groups such as carboxylic acid and amine functional groups, polyurethanes, and polyoxyalkylene polyamines.

Particularly preferred latent curatives include dicyandiamides, imidazole derivatives, aromatic polyamines, organic acid anhydrides and blends of two or more of these.

Particularly preferred examples of fillers include calcium carbonate, clays and silicates.

Particularly preferred metal powders are aluminium zinc, copper, bronze, brass, nickel and iron.

Particularly preferred thixotropic agents include amorphous silica, bentonite, attapulgite and organic modifications and mixtures thereof.

A further embodiment of the invention provides a process for preparation of an adhesive composition comprising combining the epoxy resin component, metal oxide, polyhydroxyaryl compound and curing agent and any additives such as fillers or thixotropic agents.

In one embodiment all the components are simply mixed together to form a single adhesive composition which is preferably subject to high shear mixing. Alternatively the adhesive composition may be prepared in situ.

For example, in an embodiment of the invention the bonding substrate, such as metal, is coated with the polyhydroxyaryl compound and is subsequently coated with a composition comprising a mixture of the metal oxide, epoxy resin, curing agent and any other components.

In a further embodiment of the invention there is provided a process for coating a substrate with adhesive comprising coating the surface of the substrate with a polyhydroxyaryl compound of formula I, a metal oxide and a hot-curing epoxy resin composition and heating to a temperature of at least 100° C. to effect curing of the epoxy composition.

Where it is intended to bond a surface to another surface (for example metal to metal or metal to plastic) the contact surface(s) may be treated with the polyhydroxyaryl compound and the other components of the epoxy resin adhesive composition including the metal oxide and the surfaces bonded together.

The coating of the surfaces with the polyhydroxyaryl compound may be carried out before the application of the remaining components of the resin. However, it is generally preferred that the polyhydroxyaryl compound be incorporated into the epoxy adhesive composition and the adhesive composition applied to the surface.

The polyhydroxyaryl compound can be mixed into the epoxy composition, or component thereof, using a simple blending technique such as simply stirring the two materials together. However, a more effective dispersion can be achieved by the use of a high shear mixing device such as, for example an Ultra Turrax or a Silverson high shear mixer.

An epoxy adhesive composition which includes a polyhydroxyaryl compound and zinc oxide can be applied to the surface of a substrate, for example a metal surface, and cured using similar, or identical, conditions as can be used for the same epoxy adhesive composition which is free from polyhydroxyaryl compound and zinc oxide.

The process of the present invention may be used to bond together substrates such as a metal and a plastic material or two sheets of metal. We have found that the initial adhesive strength of the bond is generally the same as, or slightly greater than, the initial adhesive strength of a bond obtained when using the epoxy adhesive alone. However, in tests of the durability of the bond, we have found that the use of the polyhydroxyaryl compound and zinc oxide results in a higher bond strength and slower deterioration of the strength of the bond.

The present invention also provides a substrate, preferably a metal, at least part of one surface of which has been coated with a heat curable epoxy resin adhesive comprising a compound of formula I and a metal oxide.

The invention also includes an article having bonded surfaces, preferably metal, wherein the surfaces bonded together have been treated with a heat curable epoxy resin adhesive comprising a compound of formula I and a metal oxide.

The invention is described but is in no way limited to the following examples.

COMPARATIVE EXAMPLE A (CE-A)

A toughened epoxy resin adhesive was prepared having the following ingredients in the proportions indicated.

| Component | Percent by weight |
| --- | --- |
| Bis phenol A resin | 30.8 |
| Bis phenol F resin | 14.8 |
| Polyoxylpropylene diamine | 13.6 |
| Dicyandiamide | 3.6 |
| Imidazole | 0.9 |
| Calcite | 29.8 |
| Al Powder | 5.9 |
| Amorphous $SiO_2$ | 0.5 |
| Pigment | 0.1 |
| | 100.0 |

EXAMPLE 1 (Ex1)

A composition in accordance with the invention was prepared by the addition of gallic acid and zinc oxide to the composition of comparative Example A to provide the composition shown below. The composition was thoroughly mixed.

| Component | Percent by weight |
| --- | --- |
| Bis phenol A resin | 30.2 |
| Bis phenol F resin | 14.5 |
| Polyoxylpropylene diamine | 13.4 |
| Dicyandiamide | 3.5 |
| Imidazole | 0.9 |
| Calcite | 29.1 |
| Al Powder | 5.8 |
| Gallic acid | 1.0 |
| Zinc oxide | 1.0 |
| Amorphous $SiO_2$ | 0.5 |
| Pigment | 0.1 |

TESTING

The compositions of Comparative Example A (CE.A) and Example 1 (Ex1) were tested to determine their relative Lap Shear and T-Peel strength in adhering steel surfaces in side by side tests.

Assemblies bonded using the adhesives were subject to the following tests which were conducted on different samples:

Water immersion—30 days immersion in water at 40° C.
Humid Aging—30 days at 50° C. and 95% relative humidity.
APGE test—30 cycles of testing each cycle consisting of the following conditions:
  0.15 hours in 5% salt solution
  1.2–1.3 hours room temperature drying
  22.55–22.65 hours at 50° C. and 95% relative humidity
for about 48 hours.

Lap Shear and T-Peel tests were carried out on bonded steel surfaces prepared as follows:

Lap Shear

Samples of CRLC steel of dimensions 25 mm×75 mm×0.8 mm were degreased with Petroleum spirit and adhesive of 0.2 mm thickness applied to the surface.

A second piece of steel of the same dimensions and degreased by the same method. Testing carried out to the method described in ASTM D-1002.

The assemblies were cured for 25 minutes at 170° C.

T-Peel

Two pieces of CRLC steel of dimensions 25 mm×200 mm×0.8 mm were bonded using the method referred to in reference to Lap Shear.

Lap Shear and T-Peels were determined on each of CEA and EX1. Testing method as per ASTM D-1876.

Results of the testing are shown in Table 1.

TABLE 1

|  | Lap Shear (MPa) | | T-Peel (N/25 mm) | |
|---|---|---|---|---|
|  | Ex 1 | CEA | Ex 1 | CEA |
| Initial | 21.27 | 19.52 | 231.7 | 230.1 |
| Water Immersed | 20.13 | 9.82 | 231.7 | 187 |
| Humid Ageing | 18.65 | 10.28 | 213.9 | 233.4 |
| APGE (30-cycles) | 13.71 | 0.88 | 167.1 | 125.2 |

COMPARATIVE EXAMPLE B (CE-B)

A single pack heat curable adhesive was prepared having the composition listed in Table 2 below and was mixed thoroughly to provide a homogenous composition and Lap Shear and T-peel strengths are determined as for Example 1.

EXAMPLE 2 (EX2)

A single pack heat curable adhesive was prepared having the composition listed in Table 2 below and was mixed thoroughly to provide a homogenous composition and Lap Shear and T-peel strengths were determined as for Example 1.

TABLE 2

| Component | Percent by Weight | |
|---|---|---|
|  | CE-B | Ex 2 |
| Bis phenol A resin | 32.5 | 32.2 |
| Bis phenol F resin | 14.8 | 14.6 |
| Polyoxylpropylene diamine | 11.8 | 11.7 |
| Dicyandiamide | 3.5 | 3.5 |
| Imidazole | 0.9 | 0.9 |
| Calcite | 29.6 | 29.3 |
| Al Powder | 5.9 | 5.8 |
| Gallic acid | 1.0 | 1.0 |
| Zinc oxide | — | 1.0 |
| Lap shear | 15.88 MPa | 18.34 MPa |
| T-Peel | 165.8 N/25 mm | 188.0 N/25 mm |

As demonstrated in Table 1 and Table 2 the presence of the combination of polyhydroxyaryl compound and zinc oxide provides an adhesive of significantly improved binding strength and resistance to weathering.

EXAMPLE 3

A single-pack heat curable adhesive was prepared having the following composition and was found to have excellent bond strength and resistance to weathering.

| Component | Percent by weight |
|---|---|
| Bisphenol A diglycidyl ether (EGW 188) | 29.9 |
| Bisphenol F diglycidyl ether (EGW 176) | 14.7 |
| Polyoxypropylene diamine (AEW 514) | 13.2 |
| Dicyandiamide | 3.5 |
| 2-($\beta$-(2'-methylimidazoyl-(1')))-ethyl-4,6-diamino-s-triazine | 0.9 |
| Precipitated Calcium Carbonate | 29.3 |
| Aluminium Powder | 5.9 |
| Amorphous Silica | 0.5 |
| Pigment | 0.1 |
| Gallic acid | 1.0 |
| Zinc oxide | 1.0 |

What I claim is as follows:

1. In a heat curable liquid epoxy resin composition the improvement in combination therewith comprising a metal oxide and a polyhydroxyaryl compound of formula I

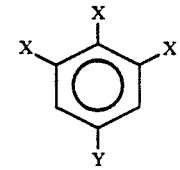

wherein:
  each X is independently an —OH group or a group —ROH and at least one of the groups X is an —OH group;
  Y is a hydrogen atom, a group $R^1$, a group $COR^2$ or a group $NR^3R^4$;
  R is a divalent hydrocarbon or substituted hydrocarbon group;
  $R^1$ is a hydrocarbyl or substituted hydrocarbyl group;
  $R^2$ is a group $R^1$, $OR^3$ or $NR^3R^4$;
  $R^3$ is a hydrogen atom, a hydrocarbyl or a substituted hydrocarbyl group;
  $R^4$ is a hydrogen atom, a hydrocarbyl or a substituted hydrocarbyl group; and
  $R^3$ and $R^4$ can be the same or different.

2. A composition according to claim 1 wherein in the compound of formula I:

each X is independently an —OH group or a group —ROH and at least one of the groups X is an —OH group;

Y is a hydrogen atom, a group $R^1$, a group $COR^2$ or a group $NR^3R^4$;

R is selected from the divalent radicals —CH=N— and —CH$_2$—;

$R^1$ is a $C_1$ to $C_{18}$ hydrocarbyl group optionally substituted with one or more halogen atoms or amino, hydroxy or epoxy groups;

$R^2$ is a group $R^1$, $OR^3$ or $NR^3R^4$;

$R^3$ is a hydrogen atom or a $C_1$ to $C_{18}$ hydrocarbyl group optionally substituted with one or more halogen atoms or amino, hydroxy or epoxy groups;

$R^4$ is a hydrogen atom or a $C_1$ to $C_{18}$ hydrocarbyl group optionally substituted with one or more halogen atoms or amino, hydroxy or epoxy groups; and $R^3$ and $R^4$ are the same or different.

3. A composition according to claim 1 wherein in the compound of formula I:

each X is an —OH group;

Y is a hydrogen atom, a group $R^1$, a group $COR^2$ or a group $NR^3R^4$;

$R^1$ is a $C_1$ to $C_6$ hydrocarbyl group optionally substituted with amino or hydroxy;

$R^2$ is a group $R^1$, $OR^3$ or $NR^3R^4$;

$R^3$ is a hydrogen atom or a $C_1$ to $C_{18}$ hydrocarbyl group;

$R^4$ is a hydrogen atom or a $C_1$ to $C_{18}$ hydrocarbyl group optionally substituted with amino or hydroxy; and $R^3$ and $R^4$ are the same or different.

4. A composition according to claim 1 wherein in the compound of formula I:

each X is an —OH group;

Y is a hydrogen atom, a group $R^1$ or a group $COR^2$;

$R^1$ is a 2-aminoethyl or 2-hydroxyethyl group;

$R^2$ is a group $OR^3$ or $NR^3R^4$;

$R^3$ is a hydrogen atom or a $C_1$ to $C_{12}$ hydrocarbyl group;

$R^4$ is a hydrogen atom or a 2-hydroxyethyl group; and $R^3$ and $R^4$ are the same or different.

5. A composition according to claim 1 wherein the polyhydroxyaryl compound is selected from the group consisting of: pyrogallol, gallic acid, methyl gallate, propyl gallate, dodecyl gallate, gallamide, N-(2-hydroxyethyl)3,4,5-trihydroxybenzoic acid amide and 5-(2-aminoethyl)-1,2,3-trihydroxybenzene.

6. A composition according to claim 1 wherein the polyhydroxyaryl compound is gallic acid.

7. A composition according to claim 1 wherein the metal oxide is selected from the oxides of the transition elements.

8. A composition according to claim 7 wherein the metal oxide is selected from the oxides of the copper and zinc subgroups of the periodic table of the elements.

9. A composition according claim 8 wherein the metal oxide is zinc oxide.

10. A composition according to claim 1 wherein the polyhydroxyaryl compound is present in an amount of from 0.1 to 20% by weight of the composition.

11. A composition according to claim 1 wherein the metal oxide is present in an amount of from 0.01 to 10% by weight of the composition.

12. In a heat curable liquid epoxy resin composition the improvement in combination therewith comprising from 0.1 to 5% w/w zinc oxide and from 0.1 to 2% w/w gallic acid.

13. In a heat curable liquid epoxy resin composition comprising 20 to 90% w/w liquid resin; 0 to 20% w/w toughening agent; 0 to 10% w/w latent curative; 0 to 70% w/w mineral filler; 0 to 70% w/w metal powder; and 0 to 20% w/w thixotropic agent the improvement in combination therewith comprising 0.1 to 5% w/w of a metal oxide and 0.1 to 2% w/w of a polyhydroxyaryl compound of formula I as defined according to claim 1.

14. A process for the preparation of a heat curable epoxy resin as defined according to claim 1 which process comprises combining the metal oxide and polyhydroxyaryl compound with the epoxy resin component.

15. A process according to claim 14 wherein the components of the composition are combined and subjected to mixing to produce a one pack heat curable epoxy resin adhesive composition.

16. A process according to claim 14 wherein the polyhydroxyaryl compound component and the epoxy resin component comprising the metal oxide are mixed in situ on the surface of the substrate on the surface of the substrate to be bonded.

17. A process for bonding a substrate which process comprises applying to the substrate a heat curable epoxy resin composition as defined according to claim 1 and heating the substrate to effect curing of the epoxy resin.

* * * * *